US008589623B2

(12) United States Patent
Beardsley et al.

(10) Patent No.: US 8,589,623 B2
(45) Date of Patent: *Nov. 19, 2013

(54) SYSTEMS AND METHODS FOR MANAGING CACHE DESTAGE SCAN TIMES

(75) Inventors: Brent C. Beardsley, Tucson, AZ (US);
Michael T. Benhase, Tucson, AZ (US);
Lokesh M. Gupta, Tucson, AZ (US);
Sonny E. Williams, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,786

(22) Filed: Jun. 11, 2012

(65) Prior Publication Data

US 2012/0254539 A1 Oct. 4, 2012

Related U.S. Application Data

(63) Continuation of application No. 12/965,131, filed on Dec. 10, 2010.

(51) Int. Cl.
*G06F 12/00* (2006.01)
(52) U.S. Cl.
USPC .......................................... 711/113; 711/143
(58) Field of Classification Search
USPC .................................. 711/113, 143
See application file for complete search history.

(56) References Cited

U.S. PATENT DOCUMENTS

| | | | |
|---|---|---|---|
| 7,085,892 B2 | 8/2006 | Martinez et al. | |
| 7,191,207 B2 | 3/2007 | Blount et al. | |
| 7,721,043 B2 | 5/2010 | Gill et al. | |
| 7,725,661 B2 | 5/2010 | Liu et al. | |
| 7,783,836 B2 | 8/2010 | Wang | |
| 7,793,049 B2 | 9/2010 | Cain et al. | |
| 7,805,574 B2 | 9/2010 | Bell, Jr. et al. | |
| 2003/0225948 A1 | 12/2003 | Jarvis et al. | |
| 2007/0156961 A1 | 7/2007 | Houzenga et al. | |
| 2010/0037226 A1 | 2/2010 | Benhase et al. | |

OTHER PUBLICATIONS

Young Jin Nam et al., "An Adaptive High-Low Water Mark Destage Algorithm for Cached RAID5", Proceedings 2002 Pacific Rim International Symposium on Dependable Computing, Dec. 16-18, 2002, Tsukuba City, Ibaraki, Japan, 8 pages.
U.S. Appl. No. 12/965,133, filed Dec. 10, 2010, entitled "Systems and Methods for Managing Destage Conflicts".
U.S. Appl. No. 12/965,141, filed Dec. 10, 2010, entitled "Systems and Methods for Background Destaging Storage Tracks".
U.S. Appl. No. 12/965,174, filed Dec. 10, 2010, entitled "Systems and Methods for Destaging Storage Tracks From Cache".

*Primary Examiner* — Matthew Bradley
(74) *Attorney, Agent, or Firm* — Griffiths & Seaton PLLC

(57) ABSTRACT

A system includes a cache and a processor. The processor is configured to utilize a first thread to continually determine a desired scan time for scanning the plurality of storage tracks in the cache and utilize a second thread to continually control an actual scan time of the plurality of storage tracks in the cache based on the continually determined desired scan time. One method includes utilizing a first thread to continually determine a desired scan time for scanning the plurality of storage tracks in the cache and utilizing a second thread to continually control an actual scan time of the plurality of storage tracks in the cache based on the continually determined desired scan time.

12 Claims, 3 Drawing Sheets

US 8,589,623 B2

SYSTEMS AND METHODS FOR MANAGING CACHE DESTAGE SCAN TIMES

CROSS-REFERENCE TO RELATED APPLICATIONS

This application is a Continuation of U.S. patent application Ser. No. 12/965,131, filed on Dec. 10, 2010.

BACKGROUND OF THE INVENTION

1. Field of the Invention

The present invention relates in general to computing systems, and more particularly to, systems for managing destage scan times in a cache.

2. Description of the Related Art

One goal of computer storage systems is to reduce the number of destage conflicts when destaging storage tracks from a write cache so that the storage system operates more efficiently and/or faster. A destage conflict can occur when a storage track is being destaged from the write cache while a host is trying to write data to the storage track. This situation may be created because contemporary storage systems typically destage storage tracks shortly after the storage track is written to and the host must wait until the storage track is destaged from the write cache before the host is able to again write to the storage track. One technique to reduce the number of destage conflicts includes keeping storage tracks in the write cache for a longer period of time before destaging the storage tracks so that a storage track may be written to multiple times before the storage track is destaged. While this is an effective technique for reducing destage conflicts, it is also desirable that storage tracks not reside in the write cache too long so that the cache becomes completely full. It is also desirable that the cache not experience an undue amount of fluctuating between being nearly full and being nearly empty, which is known as oscillation.

SUMMARY OF THE INVENTION

Various embodiments provide systems for managing destage scan times in cache. One method utilizing a first thread to continually determine a desired scan time for scanning the plurality of storage tracks in the cache and utilizing a second thread to continually control an actual scan time of the plurality of storage tracks in the cache based on the continually determined desired scan time.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Various embodiments provide systems and methods for managing destage scan times in a cache. Also provided are physical computer storage mediums (e.g., an electrical connection including one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product for managing destage scan times in a cache.

Figure 1:
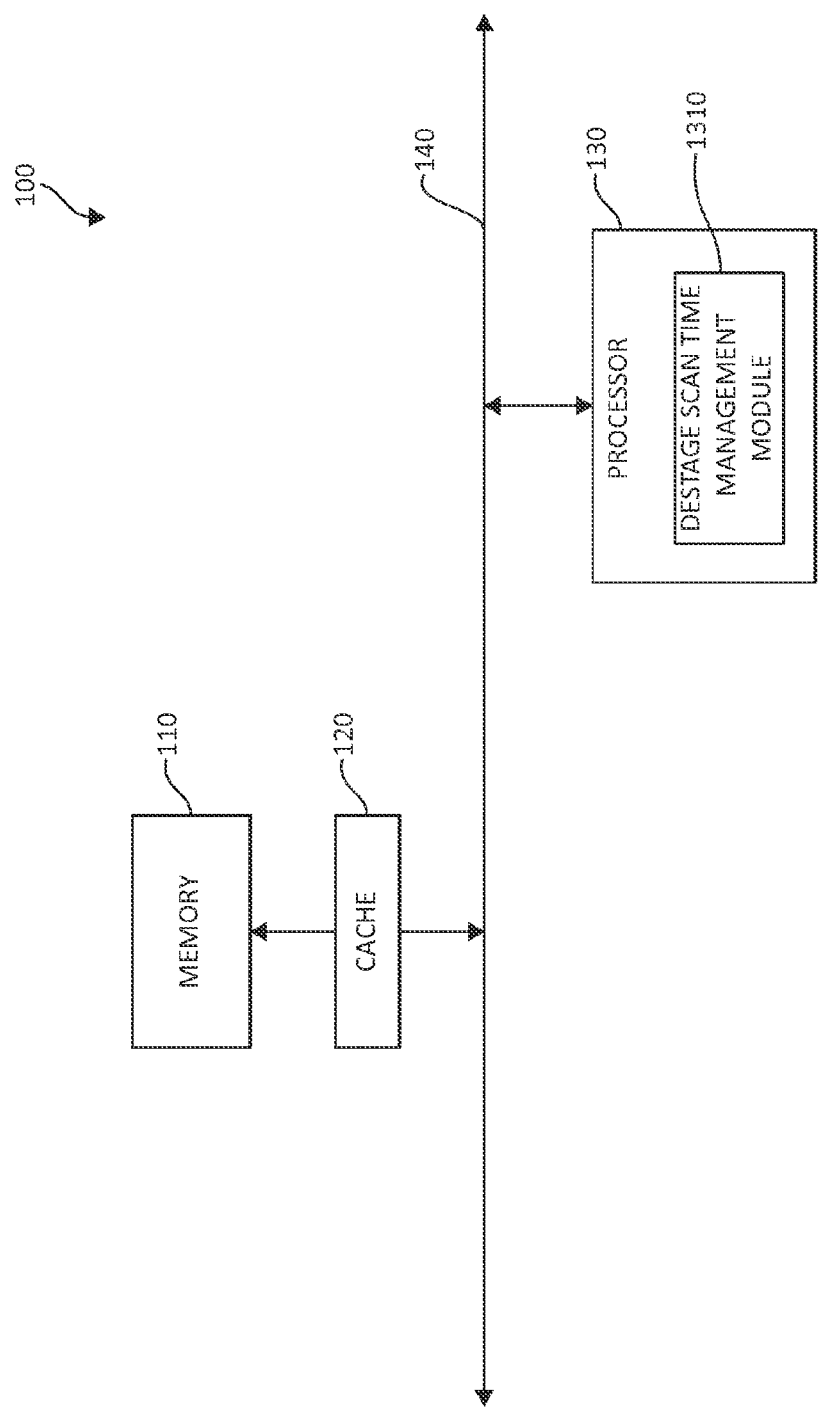
FIG. 1 is a block diagram of one embodiment of a system for managing destage scan times in a cache.

Turning now to the figures, FIG. 1 is a block diagram of one embodiment of a system 100 for managing destage scan times in cache. At least in the illustrated embodiment, system 100 comprises a memory 110 coupled to a cache 120 and a processor 130 via a bus 140 (e.g., a wired and/or wireless bus).

Memory 110 may be any type of memory device known in the art or developed in the future. Examples of memory 110 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 110, storage tracks are capable of being stored in memory 110. Furthermore, each of the storage tracks can be destaged to memory 110 from cache 120 when data is written to the storage tracks.

Cache 120, in one embodiment, comprises a write cache partitioned into one or more ranks, where each rank includes one or more storage tracks. Cache 120 may be any cache known in the art or developed in the future.

During operation, the storage tracks in each rank are destaged to memory 110 in a "foreground" destaging process after the storage tracks have been written to. That is, the foreground destage process destages storage tracks from the ranks to memory 110 while a host (not shown) is actively writing to various storage tracks in the ranks of cache 120. Ideally, a particular storage track is not being destaged when one or more hosts desire to write to the particular storage track, which is known as a destage conflict, and cache 120 does not experience large fluctuations between being nearly full and nearly empty, which is known as oscillation. To reduce the number of destage conflicts and to reduce the time in which the storage tracks reside in cache 120, processor 130 is configured to execute a method for managing destage scan times in cache 120.

In various embodiments, processor 130 comprises or has access to a destage scan time management module 1310, which comprises computer-readable code that, when executed by processor 130, causes processor 130 to perform the method for managing destage scan times in cache 120. When executing the computer-readable code in destage scan time management module 1310, processor 130 is configured to utilize a first thread to determine a desired scan time for scanning the storage tracks in cache 120 and to utilize a second thread to control the actual scan time of the storage tracks in cache 120 based on the determined desired scan time. In one embodiment, the first thread and the second thread function continuously or substantially continuously in determining the desired scan time and controlling the actual scan time, respectively.

When utilizing the first thread to determine the desired scan time, processor 130 is configured to monitor cache 120 for destage conflicts on a continual, substantially continual, or on a predetermined interval basis and increase the desired scan time by a predetermined amount of time if cache 120 is experiencing destage conflicts. In one embodiment, the increased predetermined amount of time is 100 milliseconds each time processor 130 detects destage conflicts in cache 120. In other embodiments, the increased predetermined amount of time is an amount of time less than 100 milliseconds (e.g., about 10 milliseconds to about 99 milliseconds) each time processor 130 detects destage conflicts in cache 120. In still other embodiments, the increased predetermined amount of time is an amount or time greater than 100 milliseconds (e.g., 101 milliseconds to about one second) each time processor 130 detects destage conflicts in cache 120. As such, the increased predetermined amount of time may be adjusted in accordance with the needs of a particular application of system 100.

Processor 130 is also configured to monitor cache 120 for oscillation on a continual, substantially continual, or an a predetermined interval basis and decrease the desired scan time by a predetermined amount of time if cache 120 is experiencing oscillation. In one embodiment, processor 130 is configured to decrease the desired scan time by fifty percent (50%) when processor 130 determines that cache 120 is experiencing oscillation. In another embodiment, processor 130 is configured to decrease the desired scan time by an amount less than fifty percent (e.g., about 10% to about 49%) when processor 130 determines that cache 120 is experiencing oscillation. In yet another embodiment, processor 130 is configured to decrease the desired scan time by an amount greater than fifty percent (e.g., about 51% to about 90%) when processor 130 determines that cache 120 is experiencing oscillation.

In another embodiment, processor 130 is configured to monitor the amount of data stored in cache 120 on a continual, substantially continual, or an a predetermined interval basis and decrease the desired scan time by a predetermined amount of time if cache 120 is storing an amount of data greater than a predetermined amount. In one embodiment, processor 130 is configured to decrease the desired scan when processor 130 determines that cache 120 is storing an amount of data equal to seventy percent (70%) of the total storage capacity of cache 120. In another embodiment, processor 130 is configured to decrease the desired scan time when processor 130 determines that cache 120 is storing an amount of data that is greater than seventy percent (e.g., about 71% to about 95%) of the total storage capacity of cache 120. In yet another embodiment, processor 130 is configured to decrease the desired scan time when processor 130 determines that cache 120 is storing an amount of data that is less than seventy percent (e.g., about 10% to about 69%) of total storage capacity of cache 120. In each of these embodiments, processor 130 is configured to decrease the desired scan time by fifty percent (50%), by an amount less than fifty percent (e.g., about 10% to about 49%), or by an amount greater than fifty percent (e.g., about 51% to about 90%) when processor 130 determines that cache 120 is storing an amount of data greater than the predetermined amount.

Processor 130, in various embodiments, is configured to maintain the current desired time if cache is not experiencing destage conflicts and is not experiencing a large amount of oscillation or is not storing an amount of data greater than the predetermined amount of data. With the above described, it is evident that processor 130 is configured to increase the desired scan time by a small amount of time when processor 130 detects destage conflicts in cache 120 and decrease the desired scan time by a relatively large amount of time when processor 130 determines that cache 120 is experiencing oscillation and/or is storing amount of data greater than the predetermined amount of data. In various embodiments, processor 130 is configured to enable the second thread to utilize the desired scan time in controlling the actual scan time of cache 120.

When utilizing the second thread to control the actual scan time of cache 120, processor 130 is configured to determine the amount of time it took for processor 130 to perform a previous scan of cache 120. In addition, processor 130 is configured to determine the amount of time that it has taken to complete the portion of the current scan of cache 120 that has already been completed and add this amount of time to the amount of time of the previous scan of cache 120. For example, if the previous scan of cache 120 took 750 milliseconds and the portion of the current scan of cache 120 has taken 260 milliseconds, then the total time from the beginning of the previous scan to the current time is 1010 milliseconds or 1.01 seconds.

Processor 130 is further configured to estimate the time it will take to complete the remaining portion of the current scan of cache 120 and add this time to the amount of time from the beginning of the previous scan to the current time. In one embodiment, when estimating the remaining portion of the current scan of cache 120 needing to be completed, processor 130 is configured to subtract the portion of the current scan that has been completed from an estimated total time for the current scan to create a first factor. The estimated total time may be based on an estimated number of remaining storage tracks to be scanned, an estimated remaining percentage of cache 120 to be scanned, and the like estimates, each of which may be estimated based on, for example, the total number of storage tracks scanned in the previous scan. For example, if processor 130 estimates that the 260 milliseconds in the previous example is one-third of the total time it will take to complete the current scan, processor 130 will estimate that the time it will take to complete the remaining portion of the current scan of cache 120 is 520 milliseconds (i.e., 260 milliseconds×2=520 milliseconds). In this example, the first factor is 1530 milliseconds or 1.53 seconds (i.e., 750 m/s+260 m/s+520 m/s=1530 m/s).

In another embodiment, when estimating the remaining portion of the current scan of cache 120 needing to be completed, processor 130 is configured to subtract the amount of time from the beginning of the previous scan to the current time (i.e., 1010 milliseconds in the above example) from the first factor, and divide this amount by the first factor (i.e., (1530 m/s−1010 m/s)/1530 m/s). The result of this calculation is then multiplied by the current desired time obtained from the first thread (i.e., desired time·[(1530 m/s−1010 m/s)/1530 m/s]). This result is then added to the total time from the beginning of the previous scan to the current time to obtain the first factor.

Processor 130 is configured to then divide the first factor by two times the current desired time (i.e., current desired time× 2) to determine a reference scan factor, which can be utilized to predict whether the next actual scan time will be too fast. If the reference scan factor is less than one (1), processor 130 will determine that the next actual scan time will likely be too fast and processor 130 will increase the next actual scan time for the next scan. In one embodiment, to increase the next actual scan time, processor 130 will reduce the number of destage tasks that are scanning and/or destaging storage tracks in cache 120. Reducing the number of destage tasks in cache 120 has the effect of reducing the rate at which storage tracks are scanned and/or destaged, which increases the amount of time it takes to perform an actual scan of cache 120.

If the reference scan factor is greater than one (1), processor 130 will determine that the next actual scan time will likely take longer than the desired scan time and processor 130 will not the modify the scan time for the next scan. That is, processor 130 will not reduce or increase the number of destage tasks that are scanning and/or destaging storage tracks in cache 120, which results in the amount of time for next scan time remaining substantially the same as the amount of time for the current scan time.

Figure 2:
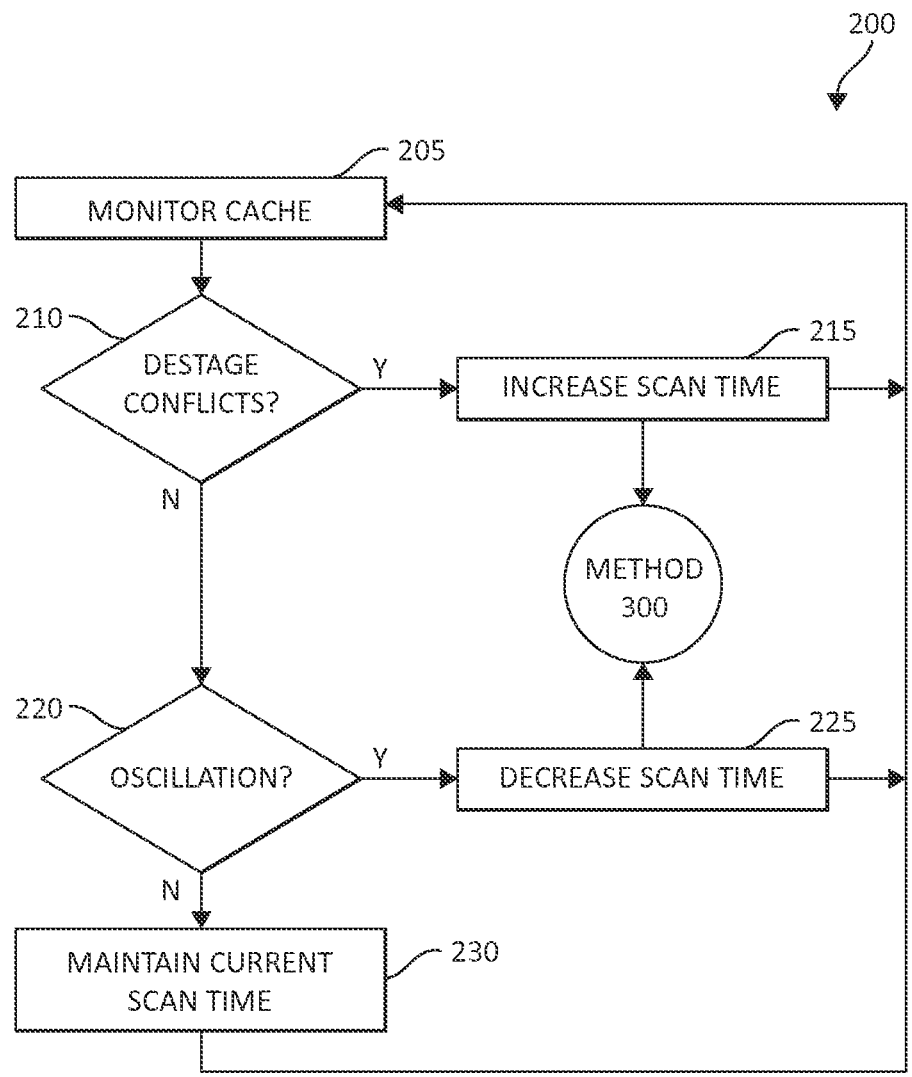
FIG. 2 is a flow diagram of one embodiment of a method for determining a desired scan time for the cache in FIG. 1.

Turning now to FIG. 2, FIG. 2 is a block diagram of one embodiment of a method 200 for determining a desired scan time for a cache (e.g., cache 120). At least in the illustrated embodiment, method 200 begins by monitoring the cache (block 205) and determining if the cache is experiencing destage conflicts (block 210).

If the cache is experiencing destage conflicts, method 200 comprises increasing the desired scan time by a predetermined amount of time (block 215). In one embodiment, the increased predetermined amount of time is 100 milliseconds each time destage conflicts are detected in the cache. In other embodiments, the increased predetermined amount of time is an amount of time less than 100 milliseconds (e.g., about 10 milliseconds to about 99 milliseconds) each time destage conflicts are detected in the cache. In still other embodiments, the increased predetermined amount of time is an amount or time greater than 100 milliseconds (e.g., 101 milliseconds to about one second) each time destage conflicts are detected in the cache. Method 200 then provides the increased scan time to method 300 (see below) and returns to monitoring the cache (block 205).

If the cache is not experiencing destage conflicts, method 200 further comprises determining if the cache is experiencing oscillation (block 220). If the cache is experiencing oscillation, method 200 comprises decreasing the desired scan time by a predetermined amount of time (block 225). In one embodiment, the desired scan time is decreased by fifty percent (50%) when the cache is experiencing oscillation. In another embodiment, the desired scan time is decreased by an amount less than fifty percent (e.g., about 10% to about 49%) when the cache is experiencing oscillation. In yet another embodiment, the desired scan time is decreased by an amount greater than fifty percent (e.g., about 51% to about 90%) when the cache is experiencing oscillation. Method 200 then provides the decreased scan time to method 300 (see below) and returns to monitoring the cache (block 205).

If the cache is not experiencing oscillation, method 200 comprises maintaining the current desired scan time (block 230). That is, the current desired scan time is maintained if the cache is not experiencing destage conflicts and is not experiencing a large amount of oscillation. Method 200 then returns to monitoring the cache (block 205).

Figure 3:
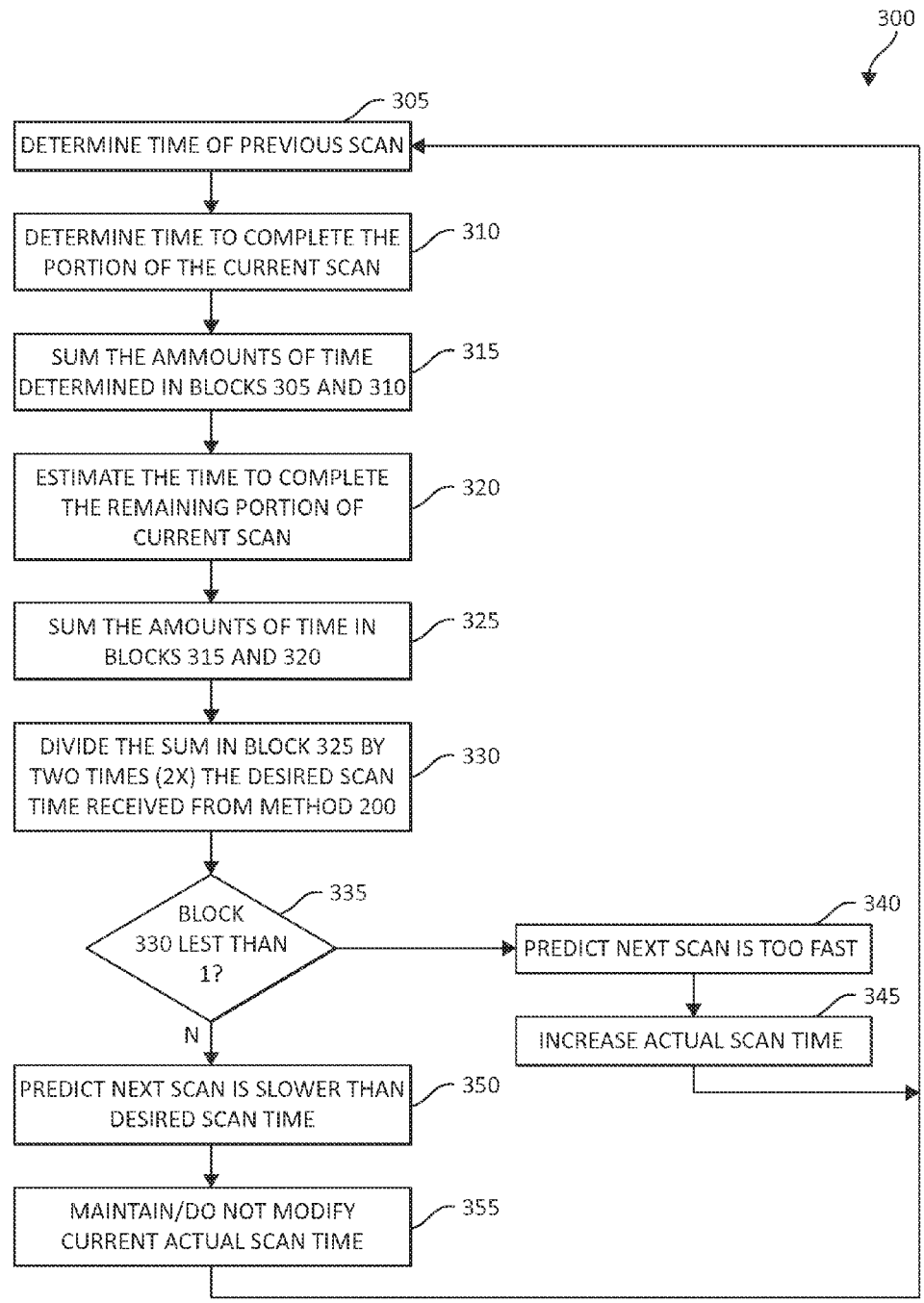
FIG. 3 is a flow diagram of one embodiment of a method for controlling an actual scan time for the cache in FIG. 1.

With reference now to FIG. 3, FIG. 3 is a block diagram of one embodiment of a method 300 for controlling an actual scan time of a cache (e.g., cache 120). At least in the illustrated embodiment, method 300 begins by determining the amount of time it took for a processor (e.g., process 130) to perform a previous scan of the cache (block 305).

Method 300 continues by determining the amount of time that it has taken to complete a portion of the current scan of the cache that has already been completed (block 310) and add this amount of time to the amount of time it took to perform the previous scan of the cache (block 315). Method 300 further comprises estimating the time it will take to complete the remaining portion of the current scan of the cache (block 320) and adding this time to the amount of time from the beginning of the previous scan to the current time calculated at block 315 (block 325). In one embodiment, estimating the remaining portion of the current scan of the cache needing to be completed comprises subtracting the portion of the current scan that has been completed from an estimated total time for the current scan to create a first factor. The estimated total time may be based on an estimated number of remaining storage tracks to be scanned in the cache, an estimated remaining percentage of the cache to be scanned, and the like estimates, each of which may be estimated based on, for example, the total number of storage tracks scanned in the previous scan.

In another embodiment, estimating the remaining portion of the current scan of the cache needing to be completed comprises subtracting the amount of time from the beginning of the previous scan to the current time from the first factor and dividing this amount by the first factor. The result of this calculation is then multiplied by the current desired time obtained from method 200 as discussed above. This result is then added to the total time from the beginning of the previous scan to the current time to obtain the first factor.

Method 300 further comprises dividing the first factor by two times the current desired time (i.e., current desired time× 2) to determine a reference scan factor (block 330). Method 300 then comprises predicting whether the next actual scan time will be too fast by determining if the reference scan factor is less than one (1) (block 335). If the reference scan factor is less than one (1), method 300 comprises determining that the next actual scan time will likely be too fast (block 340) and increasing the next actual scan time for the next scan (block 345). In one embodiment, increasing the next actual scan time comprises reducing the number of destage tasks that are scanning and/or destaging storage tracks in the cache since reducing the number of destage tasks in the cache has the effect of reducing the rate at which storage tracks are scanned and/or destaged, which increases the amount of time it takes to perform an actual scan of the cache. Method 300 then returns to determining the amount of time it took for a processor (e.g., process 130) to perform a previous scan of the cache (block 305).

If the reference scan factor is greater than one (1), method 300 comprises determining that the next actual scan time will likely take longer than the desired scan time (block 350) and not modifying or declining to the modify the scan time for the next scan (block 355. That is, the number of destage tasks that are scanning and/or destaging storage tracks in the cache will not be increased or decreased, which results in the amount of time for next scan time remaining substantially the same as the amount of time for the current scan time. Method 300 then returns to determining the amount of time it took for a processor (e.g., process 130) to perform a previous scan of the cache (block 305).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for managing destage scan times in a cache, the method comprising:
   utilizing a first thread to continually determine a desired scan time for scanning the plurality of storage tracks in the cache; and
   utilizing a second thread to continually control an actual scan time of the plurality of storage tracks in the cache based on the continually determined desired scan time, wherein continually determining the desired scan time comprises:
      monitoring the cache for destage conflicts on a substantially continual basis, increasing the desired scan time by a predetermined amount of time if the cache is experiencing destage conflicts,
      monitoring the cache for oscillation on a substantially continual basis, and
      decreasing the desired scan time by a predetermined percentage if the cache is experiencing oscillation.

2. The method of claim 1, further comprising:
   increasing the desired scan time by 100 m/s if the cache is experiencing destage conflicts;
   decreasing the desired scan time by 50% if the cache is experiencing oscillation; and
   maintaining a current desired scan time if the cache is not experiencing destage conflicts and is not experiencing oscillation.

3. The method of claim 1, wherein continually controlling the actual scan time comprises:
- determining a previous scan time;
- determining a portion of a current scan that has been completed;
- estimating a remaining portion of the current scan needing to be completed;
- summing the previous scan time, the portion of the current scan that has been completed, and the estimated remaining portion of the current scan to create a reference time;
- dividing the reference time by two times (2×) the desired scan time to create a reference scan factor; and
- modifying a next scan time for a next scan based on the reference scan factor.

4. The method of claim 3, wherein estimating the remaining portion of the current scan needing to be completed comprises:
- subtracting the portion of the current scan that has been completed from an estimated total time for the current scan to create a first factor;
- dividing the first factor by the estimated total time for the current scan to create a second factor; and
- multiplying the second factor by the desired scan time.

5. The method of claim 4, wherein modifying the next scan time for the next scan based on the reference scan time comprises:
- increasing the next scan time of the next scan if the reference scan factor is less than one (1); and
- maintaining the number of destage tasks in the cache if the reference scan factor is greater than or equal to one.

6. The method of claim 5, wherein increasing the next scan time for the next scan comprises decreasing a number of destage tasks in the cache.

7. A system for managing destage scan times in a cache, comprising:
- means for utilizing a first thread to continually determine a desired scan time for scanning the plurality of storage tracks in the cache; and
- means for utilizing a second thread to continually control an actual scan time of the plurality of storage tracks in the cache based on the continually determined desired scan time, wherein the means for utilizing the first thread to continually determine the scan time comprises:
  - means for monitoring the cache for destage conflicts on a substantially continual basis, increasing the desired scan time by a predetermined amount of time if the cache is experiencing destage conflicts,
  - means for monitoring the cache for oscillation on a substantially continual basis, and
  - means for decreasing the desired scan time by a predetermined percentage if the cache is experiencing oscillation.

8. The system of claim 7, further comprising:
- means for increasing the desired scan time by 100 m/s if the cache is experiencing destage conflicts;
- means for decreasing the desired scan time by 50% if the cache is experiencing oscillation; and
- means for maintaining a current desired scan time if the cache is not experiencing destage conflicts and is not experiencing oscillation.

9. The system of claim 7, wherein the means for utilizing the second thread to continually control the actual scan time comprises:
- means for determining a previous scan time;
- means for determining a portion of a current scan that has been completed;
- means for estimating a remaining portion of the current scan needing to be completed;
- means for summing the previous scan time, the portion of the current scan that has been completed, and the estimated remaining portion of the current scan to create a reference time;
- means for dividing the reference time by two times (2×) the desired scan time to create a reference scan factor; and
- means for modifying a next scan time for a next scan based on the reference scan factor.

10. The system of claim 9, wherein the means for estimating the remaining portion of the current scan needing to be completed comprises:
- means for subtracting the portion of the current scan that has been completed from an estimated total time for the current scan to create a first factor;
- means for dividing the first factor by the estimated total time for the current scan to create a second factor; and
- means for multiplying the second factor by the desired scan time.

11. The system of claim 10, wherein the means for modifying the next scan time for the next scan based on the reference scan time comprises:
- means for increasing the next scan time of the next scan if the reference scan factor is less than one (1); and
- means for maintaining the number of destage tasks in the cache if the reference scan factor is greater than or equal to one.

12. The system of claim 11, wherein the means for increasing the next scan time for the next scan comprises means for decreasing a number of destage tasks in the cache.

* * * * *